(12) United States Patent
Hsieh

(10) Patent No.: US 6,957,795 B1
(45) Date of Patent: Oct. 25, 2005

(54) FAST-ACTING CLAMP FOR A MUSICAL INSTRUMENT

(76) Inventor: Wu-Hong Hsieh, No. 162, Chung Shan 2nd Rd., Lu Chou City, Taipei Hsien (TW)

( * ) Notice: Subject to any disclaimer, the term of this patent is extended or adjusted under 35 U.S.C. 154(b) by 0 days.

(21) Appl. No.: 11/045,280

(22) Filed: Jan. 31, 2005

(51) Int. Cl.$^7$ .......................... A47G 1/10; A47B 96/06
(52) U.S. Cl. .............................. 248/316.4; 248/231.51; 248/316.5; 84/327
(58) Field of Search ........................ 248/231.51, 230.4, 248/230.6, 231.71, 316.1, 316.5, 316.4, 316.41; 24/456, 535; 84/421, 453, 327

(56) References Cited

U.S. PATENT DOCUMENTS

| | | | |
|---|---|---|---|
| 3,270,994 A * | 9/1966 | Machan et al. ................ 24/505 |
| 4,616,384 A * | 10/1986 | Lowell et al. ................. 24/335 |
| 4,718,151 A * | 1/1988 | LeVahn et al. ................ 24/535 |
| 5,269,034 A * | 12/1993 | Day et al. ....................... 5/637 |
| 5,626,320 A * | 5/1997 | Burrell et al. ............ 248/230.6 |
| 5,964,443 A * | 10/1999 | Leveille ........................ 248/478 |
| 6,259,011 B1 * | 7/2001 | Liao .............................. 84/421 |
| 6,493,982 B1 * | 12/2002 | Macaluso ....................... 43/25 |
| 6,584,630 B1 * | 7/2003 | Dinkler .......................... 5/622 |

* cited by examiner

Primary Examiner—Anita King
Assistant Examiner—Tan Le
(74) Attorney, Agent, or Firm—Rosenberg, Klein & Lee

(57) ABSTRACT

The fast-acting clamp for a musical instrument is selectively attached to an extending support and has a bracket, a connector, a threaded rod and a positioning assembly. The bracket is U-shaped. The connector is attached to the bracket. The threaded rod extends through the bracket. The positioning assembly has a base, a primary retainer, a secondary retainer and two springs. The base is attached to the bracket. The primary retainer is mounted pivotally on the base and has a tab, a semicircular notch and two edges. The secondary retainer is mounted pivotally on the base and has a semicircular notch and two edges. The springs connect to the base and the retainers to press the retainers inward. The tab is pressed to release the threaded rod so the fast-acting clamp can be quickly attached to or released from an extending support.

8 Claims, 5 Drawing Sheets

FAST-ACTING CLAMP FOR A MUSICAL INSTRUMENT

BACKGROUND OF THE INVENTION

1. Field of the Invention

The present invention relates to a fast-acting clamp, especially to a fast-acting clamp for a musical instrument.

2. Description of the Prior Arts

With reference to FIG. 5, a conventional clamp used to mount a musical instrument on an extending support comprises a U-shaped bracket (30), an L-shaped connector (31), a threaded rod (33) and a knob (34). The bracket (30) has a proximal side, a distal side and a through hole. The through hole is formed in the proximal side. The L-shaped connector (31) has a longitudinal leg and a transverse leg. The longitudinal leg is attached to the proximal side of the bracket (30) and has a threaded hole (32) corresponding to the through hole. The threaded rod (33) extends through the through hole, screws through the threaded hole (32) and has a proximal end. The knob (34) is mounted on the proximal end and is rotated to screw the threaded rod (33) into or out of the threaded hole (32). The musical instrument is mounted on the transverse leg of the connector (31), and the extending support is mounted in the bracket (30). The threaded rod (33) is screwed into the threaded hole (32) to attach the bracket (30) to the extending support. The threaded rod (33) is screwed out of the threaded hole (32) to release the bracket (30) from the extending support. Screwing the threaded rod (33) in or out to attach or release the bracket to or from the extending support is troublesome and slow.

To overcome the shortcomings, the present invention provides a fast-acting acting clamp to mitigate or obviate the aforementioned problems.

SUMMARY OF THE INVENTION

The main objective of the present invention is to provide a fast-acting clamp for a musical instrument. The fast-acting clamp for a musical instrument is selectively attached to an extending support and has a bracket, a connector, a threaded rod and a positioning assembly. The bracket is U-shaped. The connector is attached to the bracket. The threaded rod extends through the bracket. The positioning assembly has a base, a primary retainer, a secondary retainer and two springs. The base is attached to the bracket. The primary retainer is mounted pivotally on the base and has a tab, a semicircular notch and two edges. The secondary retainer is mounted pivotally on the base and has a semicircular notch and two edges. The springs connect to the base and the retainers to press the retainers inward. The tab is pressed to release the threaded rod so the fast-acting clamp can be quickly attached to or released from an extending support.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
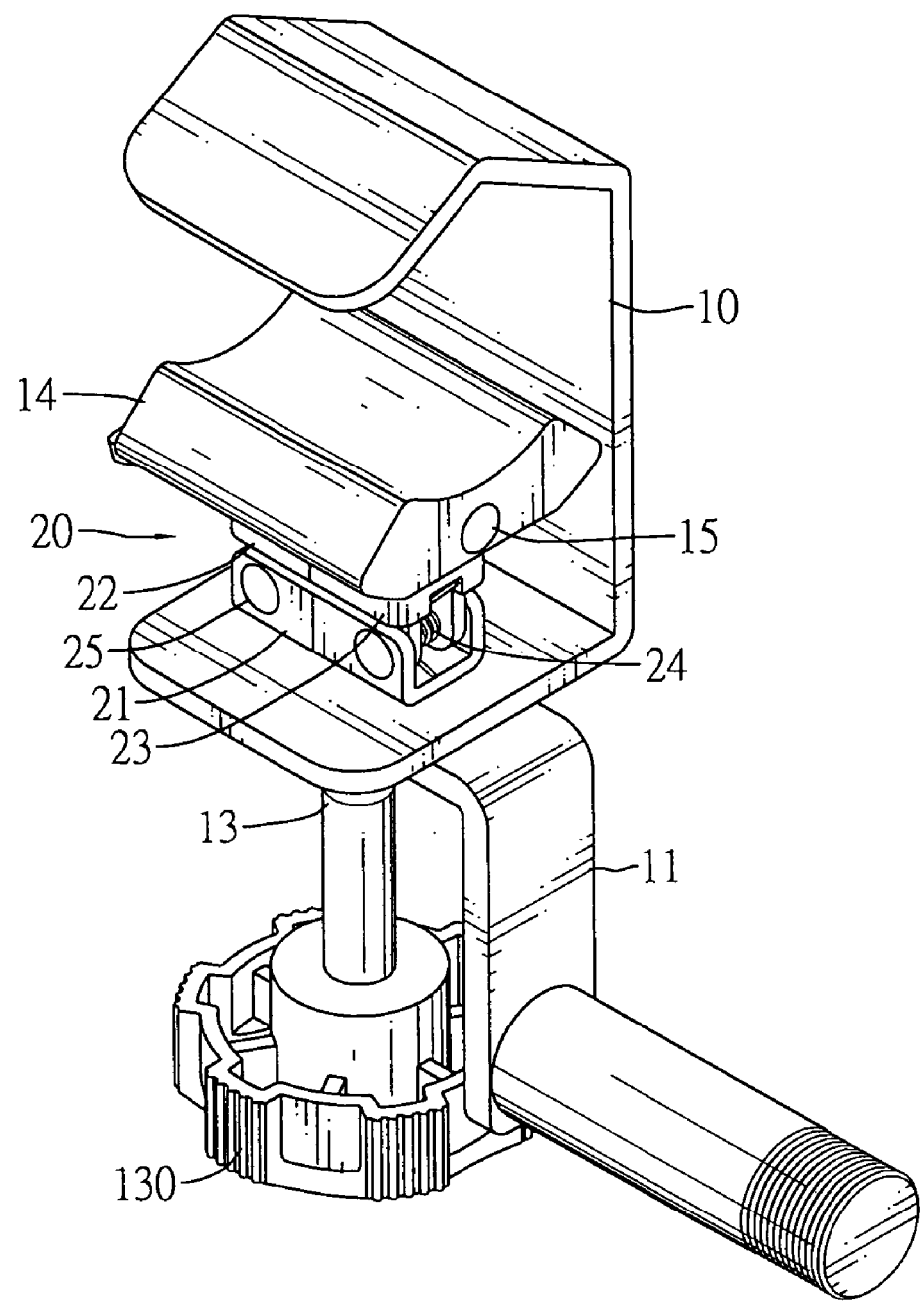
FIG. 1 is a perspective view of a fast-acting clamp for a musical instrument in accordance with the present invention.
Figure 2:
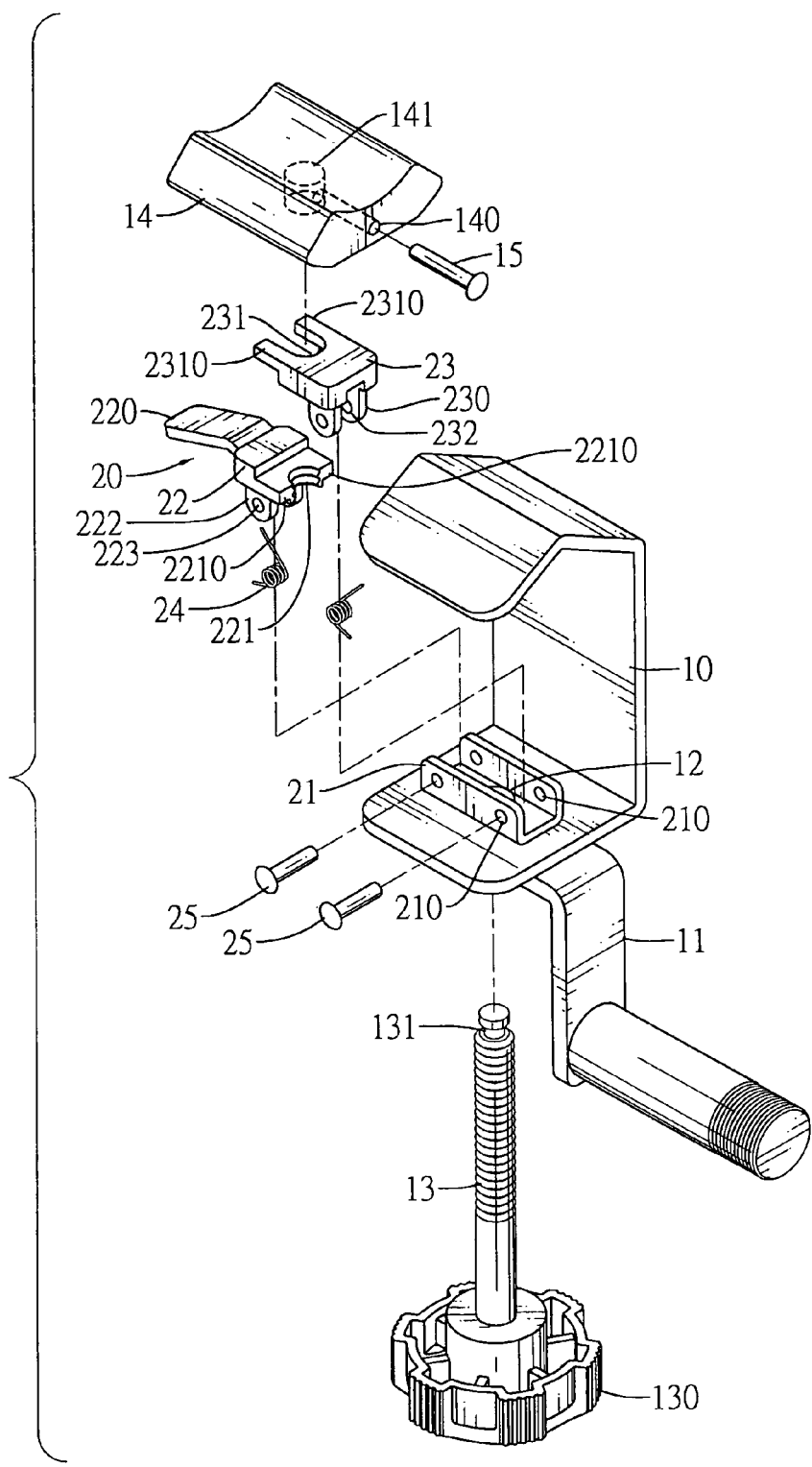
FIG. 2 is an exploded perspective view of the fast-acting clamp in FIG. 1.

With reference to FIGS. 1 and 2, a fast-acting clamp for a musical instrument in accordance with the present invention comprises a bracket (10), a connector (11), a threaded rod (13), a positioning assembly (20) and an optional moveable jaw (14).

The bracket (10) is U-shaped and has a proximal side, a distal side and a through hole (12). The proximal side has an outside surface and an inside surface. The through hole (12) is formed through the proximal side.

The connector (11) is attached to the bracket (10), may be L-shaped and may have a longitudinal leg and a transverse leg. The transverse leg is attached to the outside surface of the proximal side of the bracket (10).

The threaded rod (13) extends through the through hole (12) in the bracket (10) and has a distal end, a proximal end, an outer surface, a knob (130), a thread and an optional neck (131). The proximal end extends through the through hole (12) in the bracket (10). The knob (130) is attached to the distal end. The thread is formed around the outer surface. The neck (131) is formed near the proximal end.

The positioning assembly (20) is mounted on the inside surface of the proximal side of the bracket (10) and has a base (21), a primary retainer (22), a secondary retainer (23), two springs (24) and two optional pins (25).

The base (21) is attached to the inside surface of the proximal side of the bracket (10), may be U-shaped and may have a pair of wings and four mounting holes (210). The wings are formed perpendicularly on the base (21) and have a left end and a right end. The mounting holes (210) are formed oppositely near the left and right ends of the wings.

The primary retainer (22) is attached pivotally to the inside surface of proximal side of the base (21), has a top, a bottom, a proximal end, a distal end, a tab (220), a semicircular notch (221) and two edges (2210) and may have a pair of wings (222) and two pivot holes (223). The tab (220) is formed on the distal end. The semicircular notch (221) is formed in the proximal end and selectively engages the thread on the threaded rod (13). The edges (2210) are formed on the proximal end on opposite sides of the semicircular notch (221). The wings (222) are formed on the bottom. The pivot holes (223) are formed respectively through the wings (222) and align with the mounting holes (210) near the left end of the wings on the base (21).

The secondary retainer (23) is mounted pivotally on the base (21), has a top, a bottom, a proximal end, a distal end, a semicircular notch (231) and two edges (2310) and may have a pair of wings (230) and two pivot holes (232). The semicircular notch (231) is formed in the proximal end, corresponds to the semicircular notch (221) in the primary retainer (22) and selectively engages the thread on the threaded rod (13). The edges (2310) are formed on the proximal end on opposite sides of the semicircular notch (231) and overlap the edges (2210) of the primary retainer (22) so the edges (2310) are raised when the tab (22) on the primary retainer (22) is pressed down. The wings (230) are formed on the bottom. The pivot holes (232) are formed respectively through the wings (230) and align with the mounting holes (210) near the right end of the wings on the base (21).

The springs (24) connect to the retainers (22, 23) and the base (21) to pivot the retainers (22, 23) inward.

The pins (25) extend through the mounting holes (210) in the base (21), the springs (24) and the pivot holes (223, 232) in the retainers (22, 23) to attach the retainers (22, 23) pivotally to the base (21).

The moveable jaw (14) is attached to the proximal end of the threaded rod (13) and has a top, a bottom, a side, a mounting recess (141), a pin hole (140) and a pin (15). The mounting recess (141) is formed in the bottom and is mounted on the proximal end of the threaded rod (13). The pin hole (140) is formed in the side and communicates with the mounting recess (141). The pin (15) extends into the pin hole (140) and the neck (131) of the threaded rod (13) to hold the threaded rod (13) in the mounting recess (141).

Figure 3:
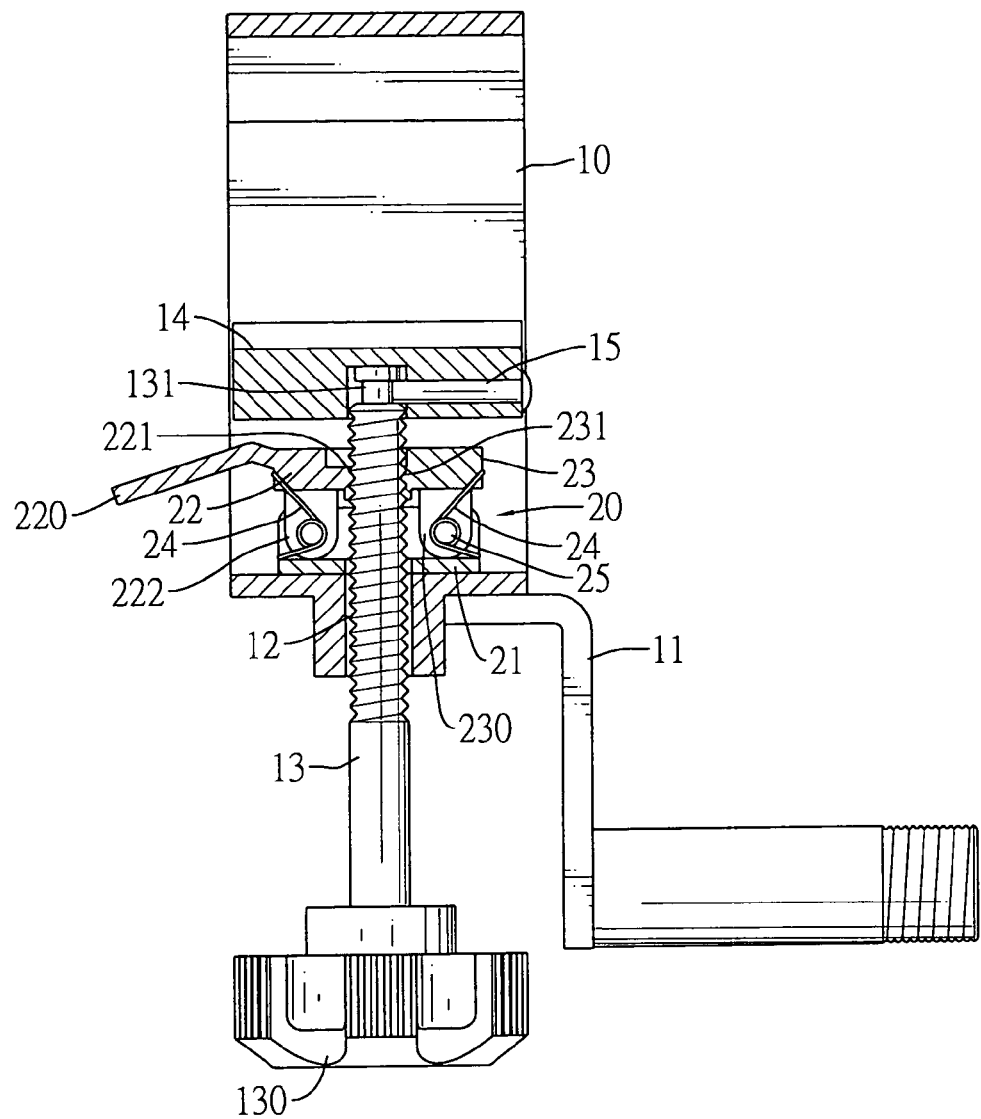
FIG. 3 is a front view in partial section of the fast-acting clamp in FIG. 1 when the threaded rod is released.

An extending support is mounted in the bracket (10) and a musical instrument is mounted on the longitudinal leg of the connector (11). With further reference to FIG. 3, the semicircular notches (221, 231) are released from the threaded rod (13) by pressing the tab (220) of the primary retainer (22) down. The semicircular notch (221) on the primary retainer (22) pivots outward and disengages from the threaded rod (13). The edges (2210) of the primary retainer (22) push the overlapping edges (2310) of the secondary retainer (23) up and the semicircular notch (231) on the secondary retainer (23) pivots outward and disengages from the threaded rod (13). Then the moveable jaw (14) can be released from or pressed against the extending support.

Figure 4:
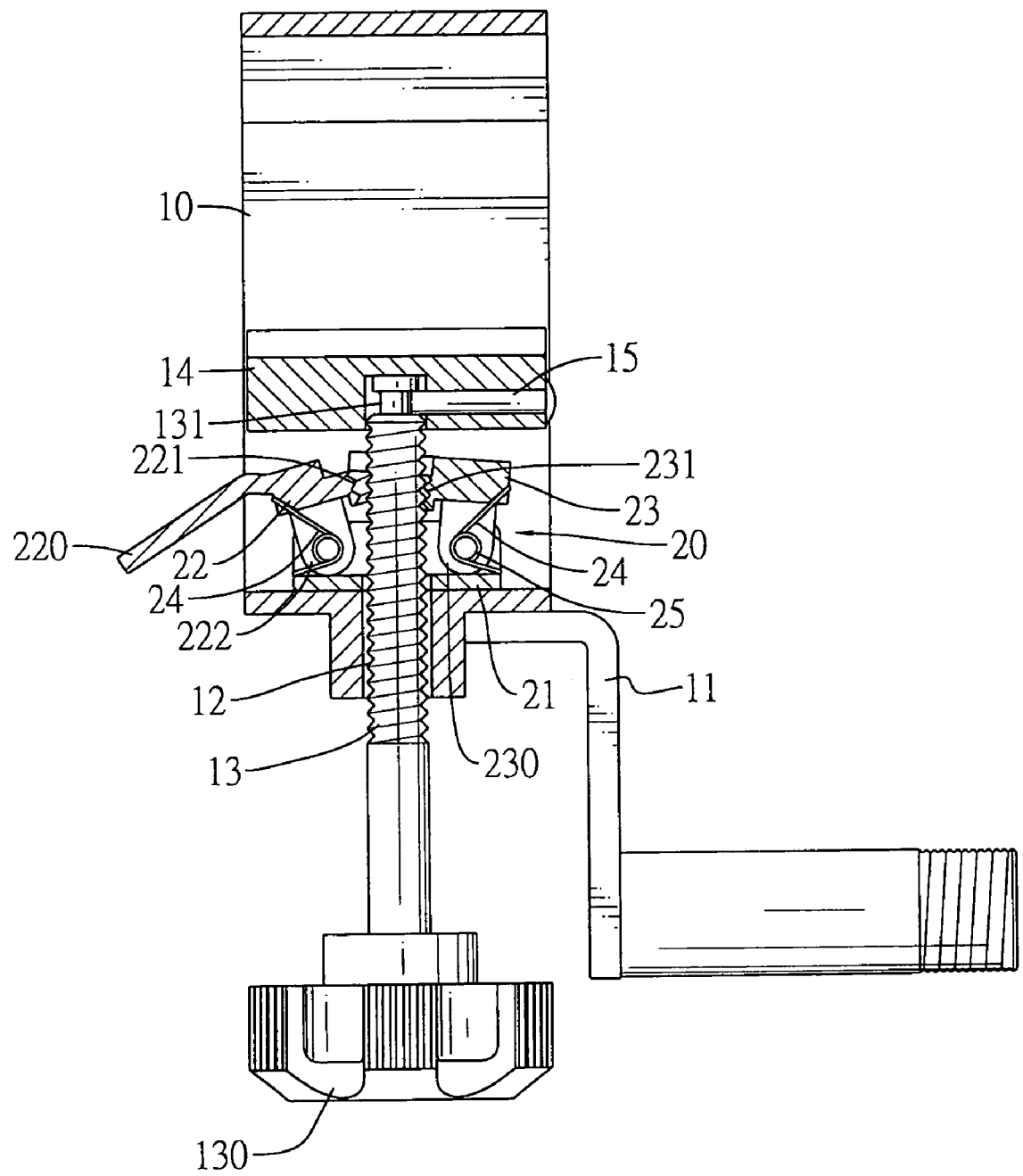
FIG. 4 is a front view in partial section of the fast-acting clamp in FIG. 1 when the threaded rod is tightened.
Figure 5:
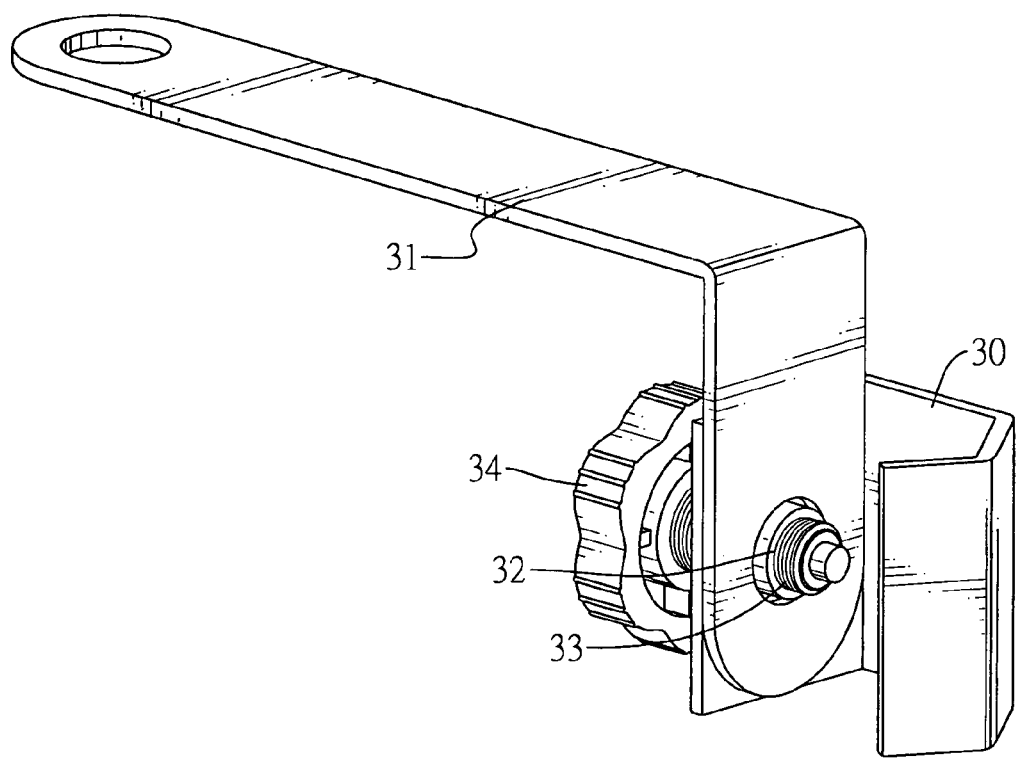
FIG. 5 is a perspective view of a conventional clamp in accordance with the prior art.

With further reference to FIG. 4, the moveable jaw (14) is tightened on an extending support by releasing the tab (220) of the primary retainer (22) and turning the knob (13) on the threaded rod (13). When the tab (220) is released, the springs (24) pivot the retainers (22, 23) so the semicircular holes (221, 231) in the retainers (22, 23) engage the thread on the threaded rod (13).

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A fast-acting clamp for a musical instrument comprising
    a bracket being U-shaped, and having
        a proximal side having an outside surface and an inside surface;
        a distal side; and
        a through hole formed through the proximal side;
        a connector having a through hole, said connector attached to the bracket;
    a threaded rod extending through the through hole in the bracket and having
        a distal end;
        a proximal end extending through the through holes in the bracket and the connector;
        an outer surface;
        a knob formed on the distal end; and
        a thread formed around the outer surface; and
    a positioning assembly mounted on the inside surface of the proximal side of the bracket and having
        a base attached to the inside surface of the proximal side of the bracket;
        a primary retainer attached pivotally to the inside surface of the proximal side of the bracket and having
            a top;
            a bottom;
            a proximal end;
            a distal end;
            a tab formed on the distal end;
            a semicircular notch formed in the proximal end and selectively engaging the thread on the threaded rod; and
            two edges formed on the proximal end on opposite sides of the semicircular notch;
        a secondary retainer mounted pivotally on the base and having
            a top;
            a bottom;
            a proximal end;
            a distal end;
            a semicircular notch formed in the proximal end, corresponding to the semicircular notch in the primary retainer and selectively engaging the thread on the threaded rod; and
            two edges formed on the proximal end on opposite sides of the semicircular notch and overlapping the edges of the primary retainer; and
        two springs connecting to the retainers and the base to pivot the retainers inward.

2. The fast-acting clamp as claimed in claim 1, wherein the connector is L-shaped and has
    a longitudinal leg; and
    a transverse leg attached to the outside surface of the proximal side of the bracket.

3. The fast-acting clamp as claimed in claim 1 further comprises a moveable jaw attached to the proximal end of the threaded rod.

4. The fast-acting clamp as claimed in claim 2 further comprises a moveable jaw attached to the proximal end of the threaded rod.

5. The fast-acting clamp as claimed in claim 3, wherein the threaded rod has a neck formed near the proximal end; and
    the moveable jaw has
        a top;
        a bottom;
        a side;
        a mounting recess formed in the bottom and mounted on the proximal end of the threaded rod;
        a pin hole formed in the side and communicating with the mounting recess; and
        a pin extending into the pin hole and the neck of the threaded rod.

6. The fast-acting clamp as claimed in claim 4, wherein the threaded rod has a neck formed near the proximal end; and
    the moveable jaw has
        a top;
        a bottom;
        a side;
        a mounting recess formed in the bottom and mounted on the proximal end of the threaded rod;
        a pin hole formed in the side and communicating with the mounting recess; and
        a pin extending into the pin hole and the neck of the threaded rod.

7. The fast-acting clamp as claimed in claim 1, wherein
the base of the positioning assembly is U-shaped and having
- a pair of wings formed perpendicularly on the base and having a left end and a right end; and
- four mounting holes formed oppositely near the left and right ends of the wings;

the primary retainer has
- a pair of wings formed on the bottom of the primary retainer; and
- two pivot holes formed respectively through the wings and corresponding to the mounting holes near the left end of the wings on the base;

the secondary retainer has
- a pair of wings formed on the bottom of the secondary retainer; and
- two pivot holes formed respectively through the wings and corresponding to the mounting holes near the right end of the wings on the base; and the positioning assembly has two pins extending through the mounting holes in the base, the springs and the pivot holes in the retainers.

8. The fast-acting clamp as claimed in claim 6, wherein
the base of the positioning assembly is U-shaped and having
- a pair of wings formed perpendicularly on the base and having a left end and a right end; and
- four mounting holes formed oppositely near the left and right ends of the wings;

the primary retainer has
- a pair of wings formed on the bottom of the primary retainer; and
- two pivot holes formed respectively through the wings and corresponding to the mounting holes near the left end of the wings on the base;

the secondary retainer has
- a pair of wings formed on the bottom of the secondary retainer; and
- two pivot holes formed respectively through the wings and corresponding to the mounting holes near the right end of the wings on the base; and the positioning assembly has two pins extending through the mounting holes in the base, the springs and the pivot holes in the retainers.

\* \* \* \* \*